United States Patent
Balkan

(10) Patent No.: US 10,324,865 B2
(45) Date of Patent: Jun. 18, 2019

(54) MAINTAINING ORDERING REQUIREMENTS WHILE CONVERTING PROTOCOLS IN A COMMUNICATIONS FABRIC

(71) Applicant: Apple Inc., Cupertino, CA (US)

(72) Inventor: Deniz Balkan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 15/257,527

(22) Filed: Sep. 6, 2016

(65) Prior Publication Data

US 2018/0067877 A1    Mar. 8, 2018

(51) Int. Cl.
    *G06F 13/16*    (2006.01)
    *G06F 13/40*    (2006.01)
    *G06F 13/42*    (2006.01)

(52) U.S. Cl.
    CPC ...... *G06F 13/1642* (2013.01); *G06F 13/1673* (2013.01); *G06F 13/4022* (2013.01); *G06F 13/4282* (2013.01)

(58) Field of Classification Search
    CPC ............. G06F 13/1642; G06F 13/1673; G06F 13/4022; G06F 13/4282
    USPC ......................................................... 710/310
    See application file for complete search history.

(56) References Cited

U.S. PATENT DOCUMENTS

| | | | |
|---|---|---|---|
| 4,423,480 A | 12/1983 | Bauer et al. | |
| 6,453,360 B1 | 9/2002 | Muller et al. | |
| 6,571,308 B1 | 5/2003 | Reiss et al. | |
| 7,107,371 B1 | 9/2006 | Bell | |
| 7,631,128 B1 | 12/2009 | Sgrosso et al. | |
| 8,683,084 B2 | 3/2014 | Bubb et al. | |
| 9,229,896 B2 * | 1/2016 | Balkan | G06F 13/4027 |
| 9,489,304 B1 * | 11/2016 | Swarbrick | G06F 13/16 |
| 9,870,328 B2 | 1/2018 | Mukherjee et al. | |

(Continued)

OTHER PUBLICATIONS

Tse et al., U.S. Appl. No. 16/017,198, entitled "Systems and Methods for Maintaining Specific Ordering in Bus Traffic", filed Jun. 25, 2018, 48 pages.

(Continued)

*Primary Examiner* — Christopher B Shin
(74) *Attorney, Agent, or Firm* — Meyertons Hood Kivlin Kowert and Goetzel PC; Rory D. Rankin

(57) ABSTRACT

Systems and methods for maintaining an order of read and write transactions for each source through a bridge in a bus fabric are disclosed. The bridge provides a connection from a first bus to a second bus within the bus fabric. The first bus has a single path for read and write transactions and the second bus has separate paths for read and write transactions. The bridge allows writes to pass reads for a given source, but prevents reads from passing writes. The bridge forwards a write transaction out of the bridge when the write transaction is available for forwarding. The bridge forwards a read transaction from a given source out of the bridge when there are no outstanding write transactions for the given source that are older than the read transaction. The bridge prevents forwarding the read transaction from the given source out of the bridge when there are outstanding write transactions that are older than the read transaction for the given source.

17 Claims, 7 Drawing Sheets

(56) References Cited

U.S. PATENT DOCUMENTS

| | | |
|---|---|---|
| 2003/0126376 A1* | 7/2003 | Blankenship ....... G06F 12/0835 |
| | | 711/146 |
| 2004/0068603 A1* | 4/2004 | Augsburg ............. G06F 13/362 |
| | | 710/310 |
| 2009/0010342 A1 | 1/2009 | Nakano |
| 2013/0185370 A1* | 7/2013 | Li ........................... H04L 51/04 |
| | | 709/206 |
| 2014/0089484 A1 | 3/2014 | Chin et al. |
| 2014/0181349 A1* | 6/2014 | Balkan ................ G06F 13/4027 |
| | | 710/310 |
| 2014/0304441 A1* | 10/2014 | Balkan ................. G06F 13/385 |
| | | 710/105 |
| 2015/0146648 A1 | 5/2015 | Viger et al. |

OTHER PUBLICATIONS

Notice of Allowance in U.S. Appl. No. 16/017,198, dated Nov. 29, 2018, 9 pages.

\* cited by examiner

MAINTAINING ORDERING REQUIREMENTS WHILE CONVERTING PROTOCOLS IN A COMMUNICATIONS FABRIC

BACKGROUND

Technical Field

Embodiments disclosed herein are related to computing systems, and more particularly, to methods and mechanisms for maintaining an order of transactions in a bus fabric.

Description of the Related Art

Systems on chips (SoCs) are becoming increasingly complex with ever increasing numbers of agents and circuits within a typical SoC. Often, data will be shared among the different agents of the SoC, and a bus fabric may be utilized to connect the agents to each other. When an agent is generating and sending multiple transactions through the bus fabric, the agent expects the transactions to be processed in a particular order compared to how they were generated.

For example, a processor allows write requests to pass read requests, but the processor does not expect read requests to pass write requests. The processor sends multiple transactions through the bus fabric to an interface having independent channels for write requests and read requests. Therefore, maintaining a particular order of transactions in the bus fabric is essential for ensuring the proper functioning of the SoC.

SUMMARY

Systems and methods for maintaining the order of transactions in a bus fabric are contemplated.

In various embodiments, the bus fabric of a system on chip (SoC) may utilize control logic for enforcing an order of transactions passing through the bus fabric. Transactions may traverse a bridge from a first bus with a first bus protocol to a second bus with a second bus protocol. The first bus may have a single connection path shared by both read and write transactions, while the second bus may have separate connection paths for read transactions and write transactions. Read transactions sent from a given agent of the SoC may maintain their order in relation to write transactions while passing through the fabric on the first bus. However, when transactions are sent on the second bus, write transactions will be sent on a first connection path of the second bus and read transactions will be sent on a second connection path of the second bus. Therefore, the order between the read transactions and the write transactions may change. Therefore, the bridge may include control logic for maintaining an order between the read and write transactions of each source of the SoC.

In various embodiments, the control logic of the bridge forwards a write transaction out of the bridge responsive to determining the write transaction is available. For example, the bridge may store write transactions from a given agent in a respective first-in, first-out (FIFO) queue. When a given write transaction is at the head of the queue, the bridge may forward the write transaction out of the queue and onto the second connection path of the second bus. The bridge may use arbitration logic to select among available write transactions from multiple queues based on a variety of criteria. For example, priority levels may be used. In other examples, a round-robin approach may be used. However, read transactions may not be selected ahead of write transactions and pass write transactions. In various embodiments, the bridge maintains this ordering, which does not allow reads to pass writes, for transactions from a same agent.

In various embodiments, the bridge determines whether there are no outstanding write transactions for a given agent. If this is the case, the bridge forwards a read transaction from the given agent out of the bridge. The bridge may prevent forwarding the read transaction from the given agent out of the bridge when there are outstanding write transactions for the given agent. The control logic of the bridge may maintain a write counter for each agent that tracks a number of outstanding write transactions for a respective agent.

In various embodiments, when a read transaction is received from a given agent, a copy of the write counter tracking the number of outstanding write transactions for the given agent is made in a separate write counter. This separate write counter may be stored in a queue with the received read transaction. When the main write counter value for the given agent is decremented as responses for the write transactions are received, the separate counter values for the given agent are also decremented. The control logic may prevent forwarding a given read transaction until its corresponding separate counter reaches zero.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

Figure 1:
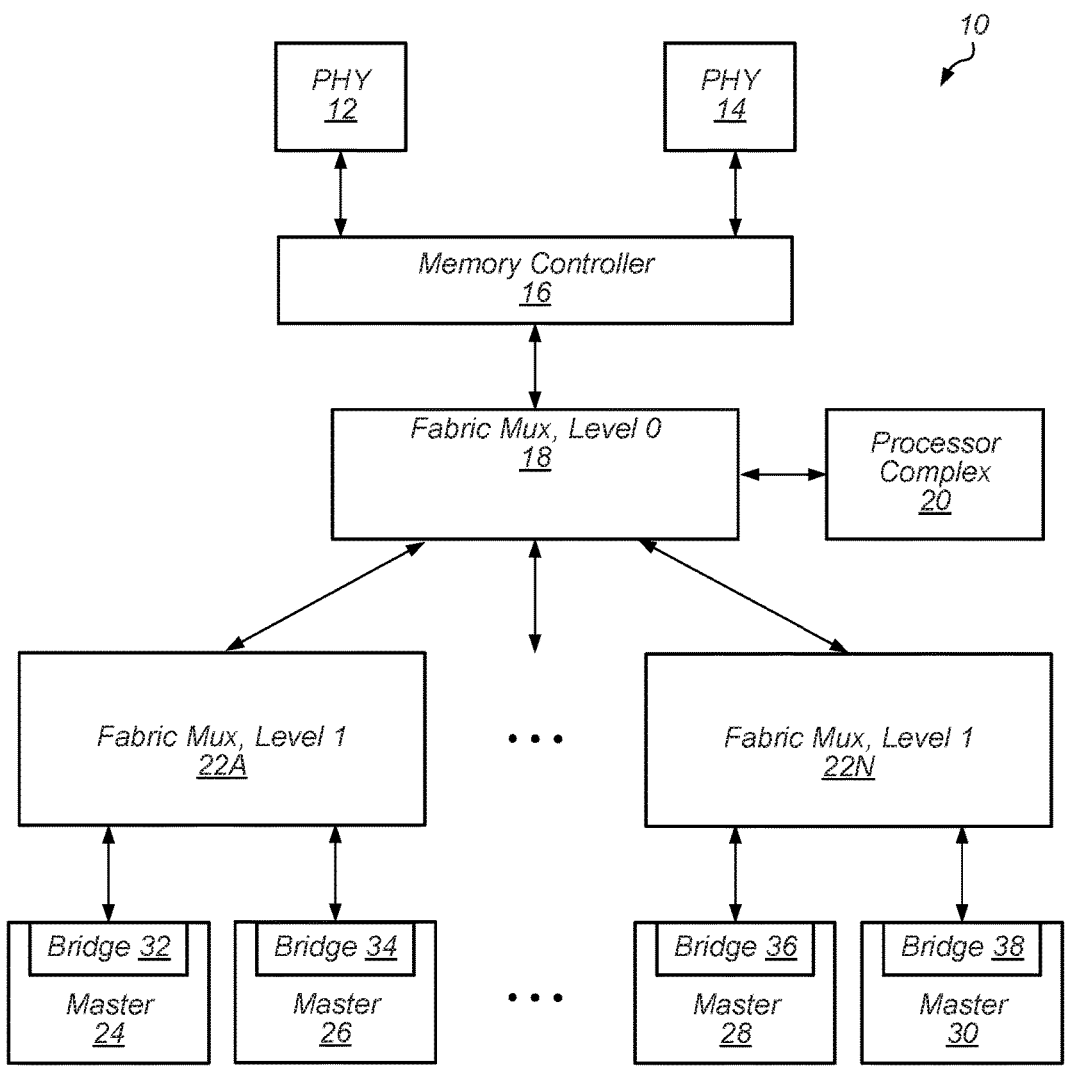
FIG. 1 is a block diagram illustrating one embodiment of a portion of an integrated circuit (IC).

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram illustrating one embodiment of a portion of an integrated circuit (IC) is shown. In the illustrated embodiment, IC 10 includes processor complex 20, level 0 fabric mux 18, level 1 fabric muxes 22A-N, masters 24, 26, 28, and 30, memory controller 16, and memory physical interface circuits (PHYs) 12 and 14. It is noted that IC 10 may also include many other components not shown in FIG. 1. In various embodiments, IC 10 may also be referred to as a system on chip (SoC), an application specific integrated circuit (ASIC), or an apparatus. Clock sources, such as phase lock loops (PLLs), and power sources are not shown for ease of illustration. Components shown within IC 10 may be coupled to each other using any suitable bus and/or interface mechanism.

Processor complex 20 may include any number of central processing units (CPUs) (not shown), a supporting cache hierarchy including a level two (L2) cache (not shown), and a variety of other components and logic. The CPU(s) of processor complex 20 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, level 0 fabric mux 18 and level 1 fabric muxes 22A-N may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted.

As shown in FIG. 1, level 1 fabric muxes 22A and 22N may be coupled to masters. Masters 24, 26, 28, and 30 may include bridges 32, 34, 36, and 38, respectively, for communicating with level 1 fabric muxes 22A and 22N. Level 1 fabric muxes 22A and 22N may utilize a first type of bus protocol for transferring data while masters 24, 26, 28, and 30 may utilize a second type of bus protocol for transferring data. Therefore, bridges 32, 34, 36, and 38 may facilitate communications between these different types of bus protocols. Bridges 32, 34, 36, and 38 may be configured to convert requests and responses as they go back and forth over different types of bus protocols. Bridges 32, 34, 36, and 38 may also be configured to enforce an order between the read and write transactions of a given source. In other embodiments, additional bridges may be located in other locations within IC 10.

In various embodiments, IC 10 may also include circuitry in the fabric to ensure coherence among different masters and other I/O devices. This circuitry may include cache coherency logic employing a cache coherency protocol to ensure data accessed by each master is kept up to date. An example of a cache coherency protocol includes the MOESI protocol with the Modified (M), Owned (O), Exclusive (E), Shared (S), and Invalid (I) states.

Masters 24-30 are representative of any number and type of components which may be coupled to the fabric of IC 10. For example, masters 24-30 may include one or more cameras, flash controllers, display controllers, media controllers, graphics units, and/or other devices. Masters 24-30 are also representative of any number of I/O interfaces or devices and may provide interfaces to any type of peripheral device implementing any hardware functionality included in the system. For example, any of the masters 24-30 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices may also include networking peripherals such as media access controllers (MACs).

Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR4, etc.), RAIVIBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc. Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
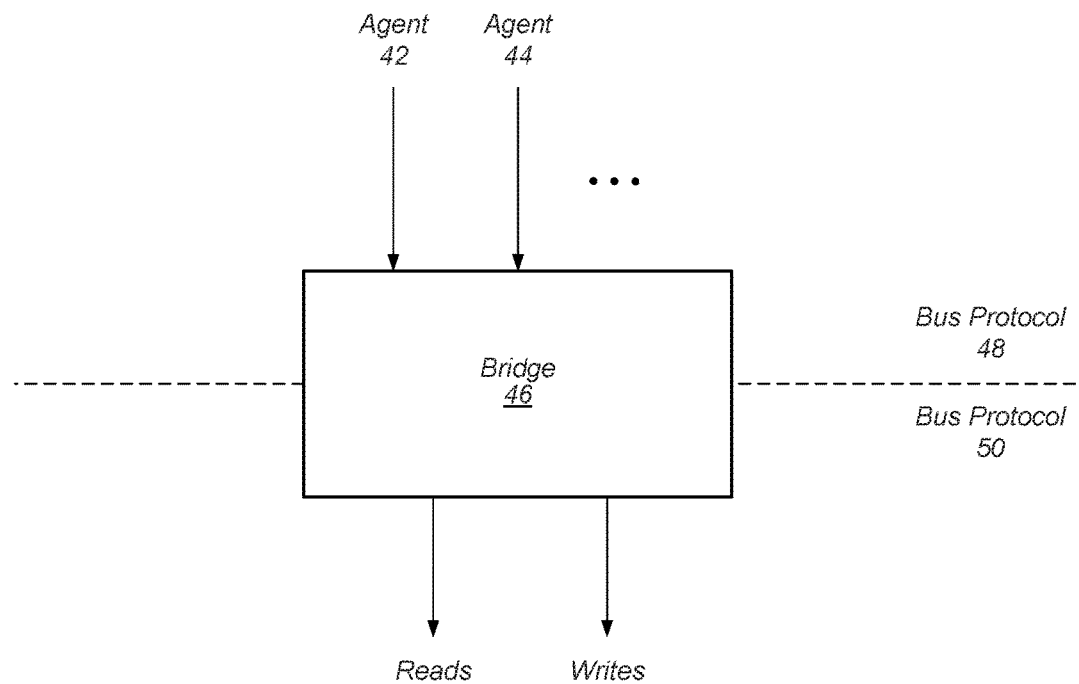
FIG. 2 is a block diagram of one embodiment of a bridge.

Turning now to FIG. 2, a block diagram of one embodiment of a bridge within a SoC is shown. Bridge 46 may provide the connection and bus conversion between two separate bus protocols, bus protocol 48 and bus protocol 50. The way in which transactions are sent on the paths of the bus fabric of the SoC may depend on the particular kind of bus protocol employed within a particular region of the bus fabric. Bus protocol 48 may be a first type of bus protocol which utilizes a shared bus for read and write transactions. Bus protocol 50 may be a second type of bus protocol which utilizes a first path for read transactions and a second path for write transactions.

Bridge 46 is connected to agents 42 and 44 on a first bus, represented by bus protocol 48. Agents 42 and 44 are representative of any number of agents or components that may be connected to bridge 46. While only two agents are shown connected to bridge 46, this is for illustrative purposes only, and in other embodiments other numbers of agents may be connected to bridge 46. For each agent on the first bus utilizing bus protocol 48, all transactions may be sent to bridge 46 on a single path. For example, one or more agents in addition to agents 42 and 44 may send transactions through this single bus after arbitration and selection is performed by a communication fabric. The bridge 46 may differentiate the transactions from the multiple agents by inspecting a master identifier (ID) used by the bus protocol 48. It is noted that the term "transaction" may be used to refer to a "memory transaction", "input/output (I/O) transaction", or other type of transaction. It is also noted that the terms "request" and "transaction" may be used interchangeably herein.

Bridge 46 may receive transactions from agents 42 and 44, respectively, and then convert the transactions to be compatible with bus protocol 50. Then, bridge 46 may forward these transactions to the targeted destination using bus protocol 50. One or more agents or devices (not shown) may be coupled to bridge 46 in the region indicated by bus protocol 50. The connections to these devices may include separate pathways for read and write transactions. Bridge 46 may route read transactions on a read pathway and route write transactions onto a write pathway to the targeted device.

The order between read and write transactions may be maintained on the connection to bridge 46 from agents 42 and 44 since both read and write transactions are routed on a shared pathway. However, when being sent to the targeted devices using bus protocol 50, the read transactions take a first path and the write transactions take a second path, which may result in transactions being processed out of order. Therefore, bridge 46 may include control logic for ensuring the read and write transactions from the same source are completed in the correct order. The control logic (not shown) may include counters for each source (e.g., agent 42, agent 44) coupled to bridge 46.

In one embodiment, bus protocol 48 may be a proprietary bus interface. The specific details (e.g., data width, signal definition) of the proprietary bus interface may vary depending on the embodiment. In other embodiments, bus protocol 48 may be any of a variety of commonly used industry standard bus protocols. For example, in some embodiments, the bus protocol may be a high-speed serial computer expansion bus protocol such as the Peripheral Component Interconnect Express (PCIe) bus protocol. In one embodiment, bus protocol 50 may be an ARM Holdings' Advanced Microcontroller Bus Architecture (AMBA®) protocol. For example, bus protocol 50 may be an Advanced eXtensible Interface (AXI) bus protocol. In other embodiments, bus protocol 50 may be any other suitable type of protocol to manage the interface between components. For an embodiment utilizing the AXI bus protocol as bus protocol 50, the read path may be split up into a read address path and a read data path. Similarly, the write path may be split up into a write address path and a write data path. However, for ease of illustration, only a single path is shown for reads and only a single path is shown for writes.

In one embodiment, bridge 46 may convert transactions from bus protocol 48 to be compliant with bus protocol 50. Bridge 46 may also convert responses and requests going from bus protocol 48 to bus protocol 50. In one embodiment, bridge 46 may convert a source identifier (ID) of a transaction to another ID for use within the bus fabric utilizing bus protocol 50. For some of the source IDs within bus protocol 48, there may be a one-to-one mapping to a specific ID within bus protocol 50. For other source IDs, multiple source IDs within bus protocol 48 may be mapped to a single converted ID within bus protocol 50.

Bridge 46 may enforce an ordering between read and write transactions to match ordering rules of the sources of the read and write transactions that are received by bridge 46 on bus protocol 48. This order may be enforced according to the converted-source IDs. In one embodiment, if there are any outstanding write transactions for a given converted-source ID, then an incoming read transaction for the given converted-source ID is stalled going downstream from bus protocol 48 to bus protocol 50. The stalling of transactions in the downstream direction may not affect responses and requests going upstream from bus protocol 50 to bus protocol 48. Therefore, responses and requests may still flow upstream with no blockage even if read or write transactions are being stalled in the downstream direction. Conversely, if there are any outstanding read transactions for a given converted-source ID, then an incoming write transaction for the given converted-source ID is not stalled going downstream from bus protocol 48 to bus protocol 50. The write transaction for the given converted-source ID passes the stalled read transactions for the given converted-source ID. However, a read transaction for the given converted-source ID does not pass the outstanding write transactions that are older than the read transaction for the given converted-source ID.

Figure 3:
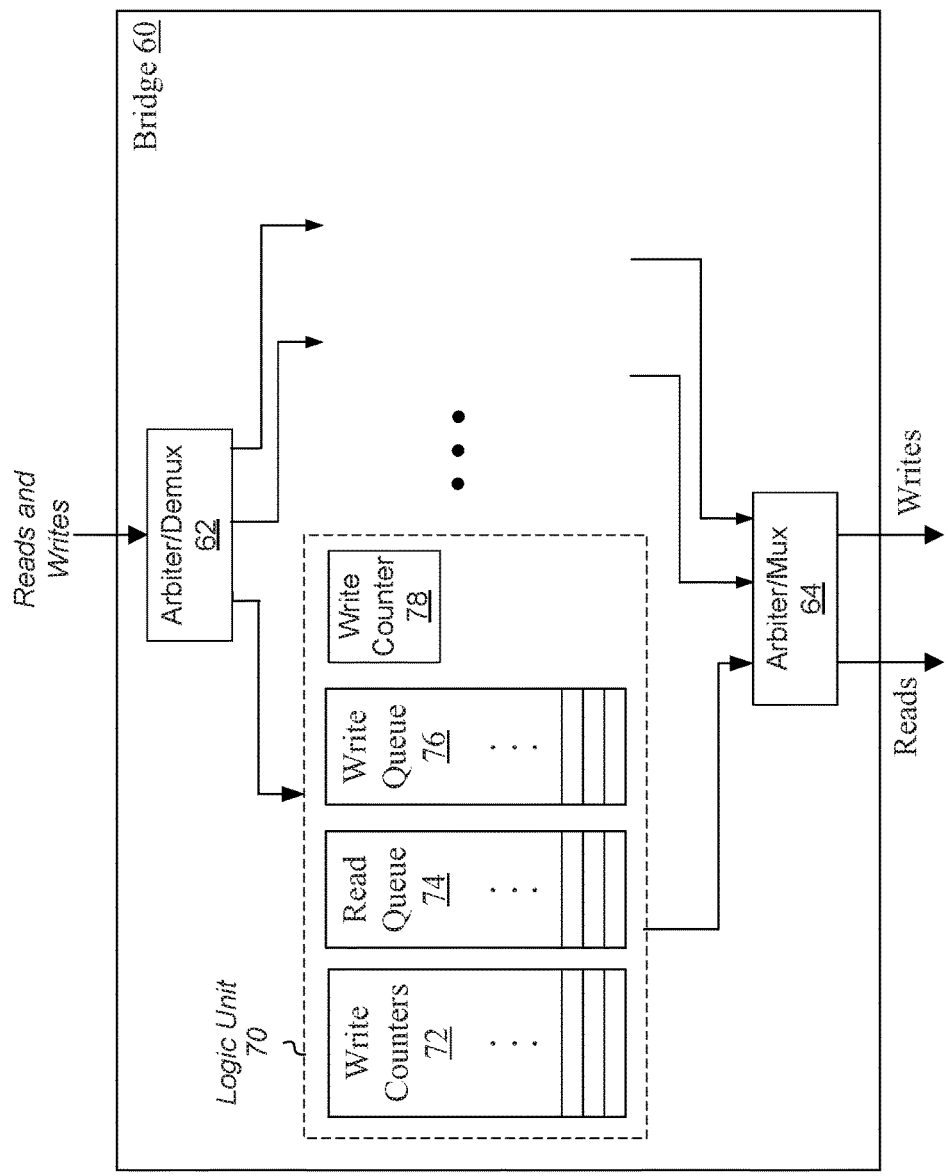
FIG. 3 is a block diagram of one embodiment of a portion of the logic in a bridge.

Referring now to FIG. 3, a block diagram of one embodiment of a portion of the control logic within a bridge is shown. Bridge 60 may include control logic for maintaining an order of transactions per source. While only a single logic unit 70 is shown in FIG. 3, it is noted that bridge 60 may include any number of logic units corresponding to any number of agents that send transactions to bridge 60. Each of these logic units may include similar logic to that shown in logic unit 70. Logic unit 70 may include logic for maintaining the order of transactions for a respective source. Bridge 60 may also include other logic not shown in FIG. 3 to avoid obscuring the figure. For example, bridge 60 may include logic for converting transactions and responses from a first bus protocol to a different second bus protocol, and vice versa.

When a transaction from the source corresponding to logic unit 70 is received by bridge 60, arbiter/demux 62 may route the transaction to control unit 70 based on the source of the transaction. Other transactions from other sources may be routed by switch 62 to their respective logic units (not shown). Logic unit 70 may include read queue 74 and write queue 76. In addition, logic unit 70 includes write counters 72 which store a separate counter for each entry in the read queue 74. In some embodiments, the read queue 74 itself includes the write counter values found in write counters 72 and a single structure is used, rather than two structures as shown. Logic unit 70 also includes a write counter 78.

In various embodiments, the write counter 78 tracks the number of outstanding write transactions for the given source. Each count value in the write counters 72 may be a copy of the write counter 78 created at a time a corresponding read transaction is received and stored in the read queue 74. Queues 74 and 76 may be any size of queue with any number of entries and fields per entry for storing transactions. In various embodiments, queues 74 and 76 may be first-in, first-out (FIFO) queues.

When a write transaction from a given source is received by logic unit 70, the write transaction may be written to the write queue 76, enqueued with any other previously received transactions, and the write counter 78 may be incremented. The write queue 76 or other control logic may determine if a particular write transaction is available for forwarding. For example, the particular write transaction may have reached the head of the FIFO structure. The arbiter 64 may select logic unit 70 for providing a next transaction to forward. For example, the arbiter 64 may use priority levels, a round-robin approach or other algorithms for selecting among the multiple logic units for forwarding transactions. When the particular write transaction is available and the logic unit 70 is selected by the arbiter 64, then the particular write transaction is forwarded from the write queue 76. After a write transaction is forwarded from the write queue 76, the slave or destination, such as a memory controller, that receives the write transaction may later issue a response. The response may be an acknowledgement. When the response for the write transaction is received by the logic Unit 70 within the bridge 60, the write counter 78 may be decremented. Similarly, each of the valid counters in the write counters 72 may be decremented.

When a read transaction from the given source is received by logic unit 70, the read transaction may be written to the read queue 74 and enqueued with any other previously received transactions. In various embodiments, a copy of the write counter 78 is created and stored in a corresponding entry of the write counters 72. As described earlier, the copy may be stored in a particular field of an entry in the read queue 74 storing the received read transaction. The copy indicates a number of outstanding write transactions for the given source at the time the read transaction was received and stored in the queue 74. The read queue 74 or other control logic may determine if a corresponding counter of the write counters 72 is zero prior to forwarding a particular read transaction out of the read queue 74.

If the corresponding counter of the write counters 72 is non-zero, which means there is at least one remaining write transaction of the outstanding write transactions for the given source at the time the particular read transaction was received and stored, then the read queue 74 may hold up the particular read transaction. The read queue 74 may hold up the particular read transaction until the corresponding counter of the write counters 72 is zero. When a given read transaction in the read queue 74 reaches the head of a FIFO structure and the outstanding write counter corresponding to the given read transaction is zero, the particular read transaction becomes available for forwarding. When the given read transaction becomes available at the logic unit 70, the arbiter 64 may select the given read transaction and it is forwarded from the read queue 74. The read transactions in the read queue 74 may not be allowed to pass on write transactions in the write queue 76 that were received before the read transaction. It is noted that the logic shown in logic unit 70 is only one possible implementation of logic for maintaining an order of read and write transactions for a given source. In other embodiments, the logic utilized within logic unit 70 may differ from that shown in FIG. 3. Further, multiple arbiters may be used, such as one arbiter for each of the read queues to select and forward transactions on the read channel and a separate arbiter for each of the write queues to select and forward transactions on the write channel.

Figure 4:
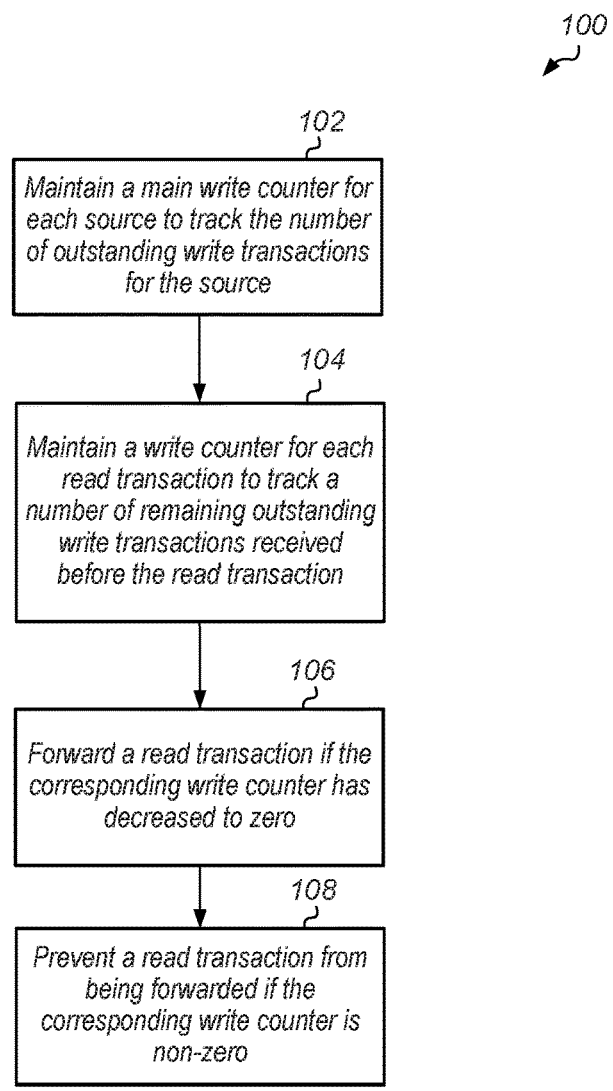
FIG. 4 is a generalized flow diagram illustrating one embodiment of a method for implementing control logic within a bridge.

Referring now to FIG. 4, one embodiment of a method 100 for implementing control logic in a bridge circuit is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, for each source in a SoC, a main write counter may be maintained in the control logic of a bridge to track the number of outstanding write transactions from the respective source (block 102). The bridge may connect a first bus to a second bus. The first bus may utilize a single path for sending read and write transactions, while the second bus may utilize separate paths for read and write transactions. In various embodiments, the main write counter increments when a write transaction is received by the bridge. In various embodiments, the main write counter decrements when a response is received for a previously forwarded write transaction, with the response indicating that the write transaction has been completed. In other embodiments, the main write counter decrements when a write transaction is forwarded from the bridge.

For each source in the SoC, another write counter may be maintained by the control logic of the bridge for each read transaction to track a number of remaining write transactions of a number of outstanding write transactions from the respective source at a time a respective read transaction was received (block 104). Each write counter for the read transactions may be a copy of the main write counter for the given source, where the copy is created at a time a corresponding read transaction is received by the bridge.

In one example, when a first read transaction from a first source is received by the bridge, there may be five outstanding write transactions in the bridge for the first source. Therefore, the write counter for the first read transaction is initiated with a count of five. When a second read transaction from the first source is received by the bridge there may be three outstanding write transactions in the bridge for the first source. Before the second read transaction is received, three write transactions for the first source may have been completed decreasing the main counter from five to two, but another write transaction may have been received from the first source increasing the main counter from two to three. Therefore, the write counter for the second read transaction is initiated with a count of three while the write counter for the first read transaction was decremented to two.

In some embodiments, when a write transaction from a given source is forwarded from the bridge, each of the write counters for the read transactions from the given source is decremented. In other embodiments, when a write transaction from a given source is completed, each of the write counters for the read transactions from the given source is decremented. The response data may be used to indicate that the write transaction has been completed.

The control logic may forward a read transaction if its corresponding write counter has decreased to zero (block 106). For example, a first source may be a first CPU, and the first CPU may forward a given read transaction to the bridge. If the corresponding write counter for the given read transaction is zero, then there are no more remaining write transactions of the outstanding write transactions in the bridge from the first CPU at the time the given read transaction was received.

The control logic may prevent forwarding a read transaction if its corresponding write counter is non-zero (block 108). For example, the first CPU may send a given read transaction to the bridge. If the corresponding write counter for the given read transaction is non-zero, then the given read transaction is ineligible to be selected for forwarding from the bridge. In contrast, the write transactions are forwarded from the bridge when the write transactions are available or ready, such as reaching the head of a FIFO structure. In this way, the write transactions pass read transactions, but read transactions do not pass write transactions from the same source. Therefore, the control logic ensures that the order of transactions from the same source is maintained when passing through the bridge from the first bus to the second bus. After block 108, method 100 may end.

Figure 5:
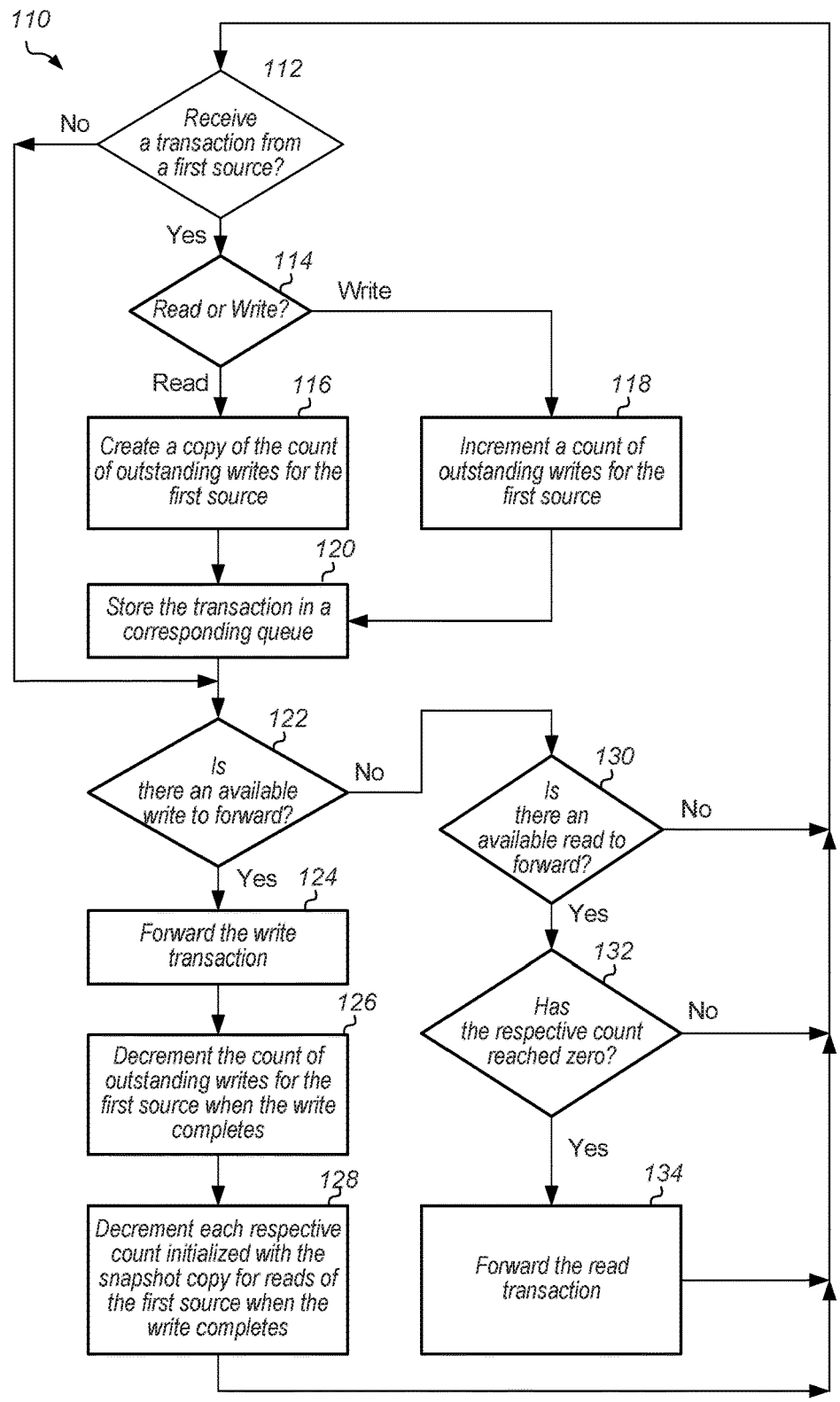
FIG. 5 is a generalized flow diagram illustrating one embodiment of a method for maintaining an order between read and write transactions passing through a bridge for each source.

Referring now to FIG. 5, one embodiment of a method 110 for maintaining an order of read and write transactions per source passing through a bridge is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a transaction from a first source may be received at a bridge (conditional block 112, "yes" leg). The transaction may be a read or a write transaction, and the transaction may be received from the first source on a first bus coupled to the bridge. The first bus may utilize a single, combined path for forwarding read and write transactions to the bridge. In various embodiments, the first source may be one of multiple sources on a SoC.

If the received transaction is a read transaction (conditional block 114, "read" leg), then a copy of a count of outstanding writes for the first source is created (block 116). If the received transaction is a write transaction (conditional block 114, "write" leg), then a count of outstanding writes for the first source is incremented (block 118). It is noted that individual write counts for pending read transactions are not incremented to reflect the newly received write transaction. In this manner, the write counts associated with pending read transactions reflect only those pending write transactions that are older than the corresponding read transaction. The received transaction may be stored in a first-in, first-out (FIFO) queue assigned to the first source (block 120). Each of the multiple sources in the SoC may have its own queues for storing its transactions. Separate read and write queues may be used. Each of the multiple sources in the SoC may have its own main counter for maintaining a count of the outstanding write transactions in the bridge from the respective source. A respective counter may be used for each read transaction for maintaining a count of a number of remaining write transactions of outstanding write transactions from the respective source in the bridge at the time the respective read transaction was received.

One or more conditions may be used to qualify a given write transaction for being selected for forwarding from the bridge. For example, the given write transaction may reach the head of a FIFO write queue. In addition, the corresponding FIFO queue may be selected for forwarding transactions over other FIFO write queues. Priority levels, source IDs, a round-robin approach and other methods may be used for selecting among the queues for forwarding transactions. However, the write transactions may not be passed by read transactions from a same source, whereas read transactions from the same source may be passed by the write transactions.

If there is a write transaction from the first source available for forwarding (conditional block 122, "yes" leg), then the write transaction is forwarded from the bridge (block 124). A count of outstanding write transactions for the first source is decremented when the forwarded write transaction completes (block 126). In addition, each respective count for the read transactions from the first source is decremented when the forwarded write transaction completes (block 128). The respective counts may have been initialized with a count of the outstanding write transactions at the time the respective read transaction was received as described earlier. The response data may be used to indicate that the write transaction has been completed. After the counts have been decremented, control flow of method 110 may return to conditional block 112.

If no write transaction from the first source is available for forwarding (conditional block 122, "no" leg), and there is no read transaction from the first source available for forwarding (conditional block 130, "no" leg), then control flow of method 110 returns to conditional block 112. However, if there is a read transaction from the first source available for forwarding (conditional block 130, "yes" leg), but the respective count is non-zero (conditional block 132, "no" leg), then control flow of method 110 returns to conditional block 112. If there is a read transaction from the first source available for forwarding (conditional block 130, "yes" leg), and the respective count has reached zero (conditional block 132, "yes" leg), then the read transaction is forwarded from the bridge (block 134). After the read transactions is forwarded from the bridge, control flow of method 110 may return to conditional block 112. If no transaction from the first source is received at the bridge (conditional block 112, "no" leg), then control flow of method 110 may move to conditional block 122 to determine whether there is an available write transaction to forward from the bridge.

It is noted that any amount of time may elapse between forwarding the transaction and receiving the response to the transaction, and that many other transactions may be received during this period of time. Therefore, method 110 may be performed in parallel for any number of transactions, and while waiting for a response for one transaction, multiple other transactions may be received and processed in accordance with the steps of method 110.

Figure 6:
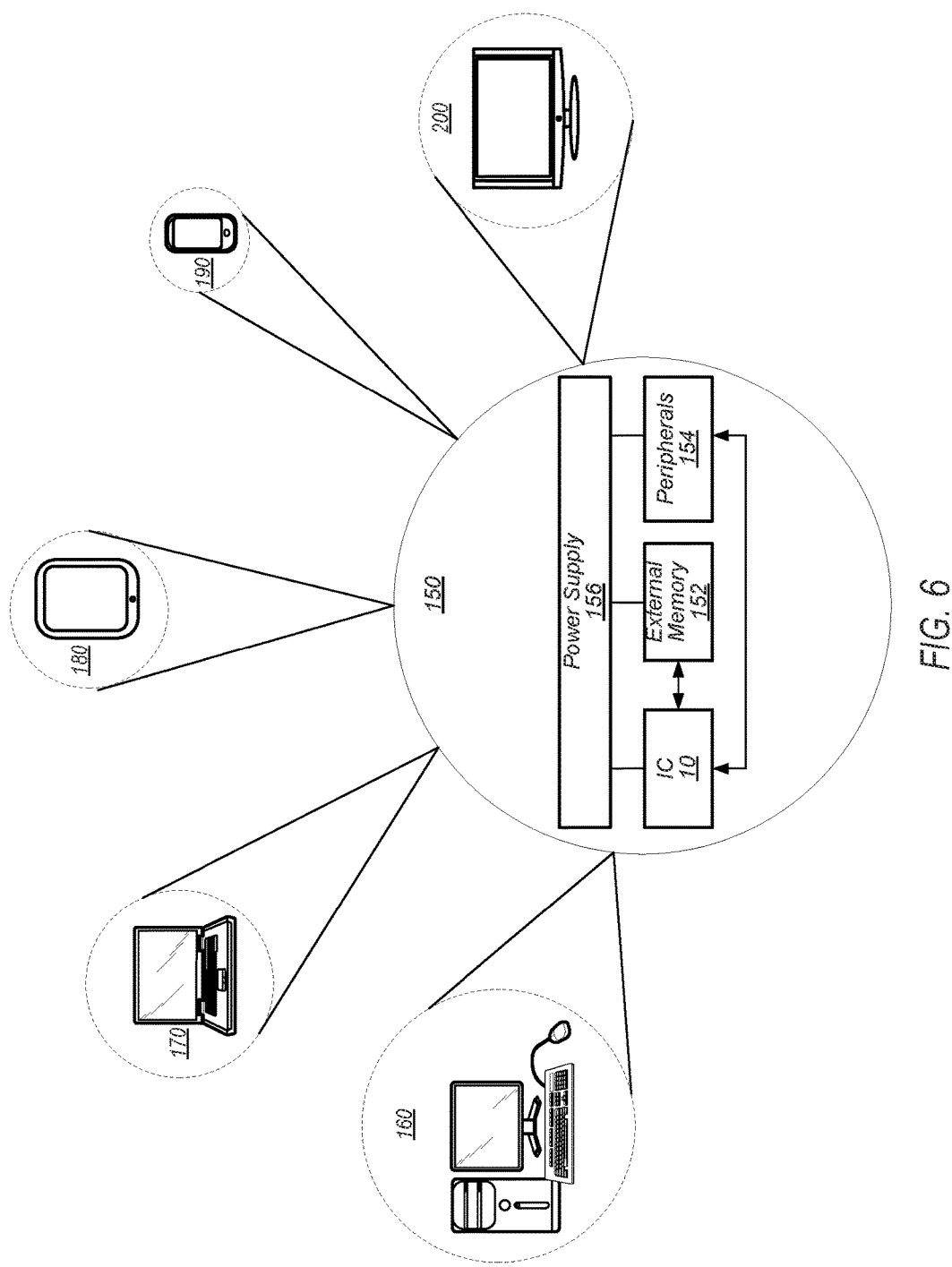
FIG. 6 is a block diagram of one embodiment of a system.

Turning now to FIG. 6, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMIVIs), etc. Alternatively, the devices may be mounted with IC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multi-touch display screens, keyboard or other input devices, microphones, speakers, etc.

Figure 7:
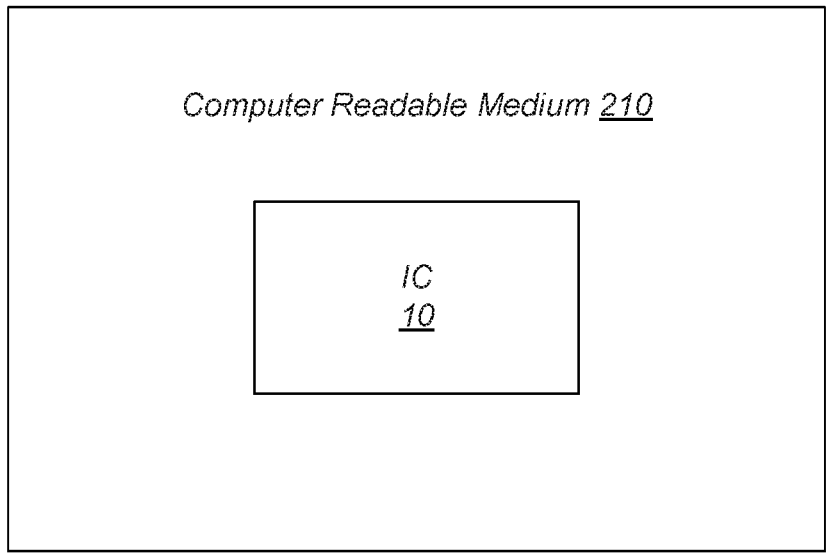
FIG. 7 is a block diagram of one embodiment of a computer readable medium.

Referring now to FIG. 7, one embodiment of a block diagram of a computer readable medium 210 including one or more data structures representative of the circuitry included in IC 10 (of FIG. 1) is shown. Generally speaking, computer readable medium 210 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 210 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 210 may be the netlist(s) (with or without the synthesis library) or the data set(s), as desired. In yet another alternative, the data structures may comprise the output of a schematic program, or netlist(s) or data set(s) derived therefrom. While computer readable medium 210 includes a representation of IC 10, other embodiments may include a representation of any portion or combination of portions of IC 10 (e.g., bridge 32).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A bridge comprising:
   a first interface configured to receive read and write transactions from a plurality of agents;
   a second interface configured to forward read and write transactions from the plurality of agents out of the bridge; and
   control logic configured to:
      forward a write transaction out of the bridge, responsive to determining the write transaction is available;
      forward a read transaction received from a given agent out of the bridge, responsive to determining there are no outstanding write transactions for the given agent;
      prevent forwarding of the read transaction out of the bridge, responsive to determining there are outstanding write transactions for the given agent; and
      maintain a separate write counter for each pending read transaction in the bridge, wherein for each pending read transaction the separate write counter indicates a number of older write transactions in the bridge that correspond to a same agent as the pending read transaction.

2. The bridge as recited in claim 1, wherein the control logic is further configured to maintain a write counter for each agent of the plurality of agents, wherein each write counter tracks a number of outstanding write transactions for a respective agent.

3. The bridge as recited in claim 2, wherein the control logic is further configured to:
   increment a first write counter associated with a given agent, responsive to receiving a write transaction at the bridge from the given agent; and
   decrement the first write counter responsive to receiving a response for a write transaction forwarded from the bridge for the given agent.

4. The bridge as recited in claim 1, wherein the control logic is further configured to:
   initialize a write counter of the separate write counters for a given read transaction from a given agent to a value of the first write counter responsive to receiving the given read transaction; and
   decrement the write counter of the separate write counters responsive to receiving a response for a write transaction forwarded from the bridge for the given agent.

5. The bridge as recited in claim 1, wherein the bridge is configured to couple a first bus to a second bus, wherein the first bus transfers read and write transactions on a single path, wherein the second bus comprises two paths, and wherein the second bus routes read transactions to a first path and routes write transactions to a second path.

6. The bridge circuit as recited in claim 1, wherein the control logic comprises a separate read and write queue for each agent.

7. The bridge circuit as recited in claim 1, wherein the first interface is configured to communicate using a first protocol, and the second interface is configured to communicate using a second protocol that is different than the first protocol.

8. A method comprising:
receiving, by a bridge, read and write transactions from a plurality of agents;
forwarding, by the bridge, a write transaction responsive to determining the write transaction is available;
forwarding, by the bridge, a read transaction from a given agent, responsive to determining there are no outstanding write transactions for the given agent;
preventing, by the bridge, forwarding of the read transaction from the given agent, responsive to determining there are outstanding write transactions for the given agent and
maintaining, by the bridge, a separate write counter for each pending read transaction in the bridge, wherein for each pending read transaction the separate write counter indicates a number of older write transactions in the bridge that correspond to a same agent as the pending read transaction.

9. The method as recited in claim 8, further comprising maintaining a write counter for each agent of the plurality of agents, wherein each write counter tracks a number of outstanding write transactions for a respective agent.

10. The method as recited in claim 9, further comprising:
incrementing a first write counter associated with a given agent, responsive to receiving a write transaction at the bridge from the given agent; and
decrementing the first write counter responsive to receiving a response for a write transaction forwarded from the bridge for the given agent.

11. The method as recited in claim 8, further comprising:
initializing a separate write counter of the separate write counters for a given read transaction from a given agent to a value of the first write counter responsive to receiving the given read transaction; and
decrementing the separate write counter responsive to receiving a response for a write transaction forwarded from the bridge for the given agent.

12. The method as recited in claim 8, wherein the bridge is configured to couple a first bus to a second bus, wherein the first bus transfers read and write transactions on a single path, wherein the second bus comprises two paths, and wherein the second bus routes read transactions to a first path and routes write transactions to a second path.

13. The method as recited in claim 8, further comprising receiving said read and write transactions according to a first protocol, and forwarding the read transaction and the write transaction according to a second protocol that is different than the first protocol.

14. The method as recited in claim 13, wherein the queue is a first-in, first-out structure.

15. A system on a chip comprising:
a plurality of agents configured to generate read and write transactions;
one or more destinations configured to process read and write transactions; and
a bridge configured to:
receive read and write transactions from the plurality of agents;
forward a write transaction out of the bridge, responsive to determining the write transaction is available;
forward a read transaction received from a given agent out of the bridge, responsive to determining there no outstanding write transactions for the given agent;
prevent forwarding of the read transaction out of the bridge, responsive to determining there are outstanding write transactions for the given agent;
maintain a separate write counter for each pending read transaction in the bridge, wherein for each pending read transaction the separate write counter indicates a number of older write transactions in the bridge that correspond to a same agent as the pending read transaction.

16. The system on a chip as recited in claim 15, wherein the bridge is further configured to maintain a separate write counter for each agent of the plurality of agents, wherein each write counter tracks a number of outstanding write transactions for a respective agent.

17. The system on a chip system on a chip as recited in claim 15, wherein the bridge is further configured to:
initialize a separate write counter of the separate writes counters for a given read transaction from a given agent to a value of the first write counter responsive to receiving the given read transaction; and
decrement the separate write counter responsive to receiving a response for a write transaction forwarded from the bridge for the given agent.

\* \* \* \* \*